United States Patent [19]

Fairbanks, Jr.

[11] 3,847,244
[45] Nov. 12, 1974

[54] LOCK APPARATUS FOR HOISTABLE VEHICLE STRUCTURES

[76] Inventor: John B. Fairbanks, Jr., 3927 S. 3030 East, Salt Lake City, Utah 84117

[22] Filed: Aug. 17, 1973

[21] Appl. No.: 389,348

[52] U.S. Cl. .............................. 180/89 A, 296/35 R
[51] Int. Cl. ............................................ B62d 39/00
[58] Field of Search ............ 296/28 C, 35 R; 298/38; 292/144, 302, DIG. 14, DIG. 43; 180/89 A, 77 TC

[56] References Cited
UNITED STATES PATENTS

| | | | |
|---|---|---|---|
| 3,099,489 | 7/1963 | Johnson | 298/38 X |
| 3,642,316 | 2/1972 | Porth et al. | 180/89 A X |
| 3,706,470 | 12/1972 | Johnson | 180/89 A X |
| 3,740,090 | 6/1973 | Lynde | 180/89 A X |

*Primary Examiner*—Lloyd L. King
*Assistant Examiner*—Randolph A. Reese

[57] ABSTRACT

For vehicles having elevatable structure relative to the vehicle frame, apparatus including a hoist cylinder wherein the cylinder itself not only effects a raising of the liftable structure, but also a locking and unlocking of such liftable structure relative to the vehicle frame. This is through linkage incorporating a lost-motion connection wherein locking and unlocking is effective prior to and also after the lifting and lowering of the liftable structure, respectively.

8 Claims, 8 Drawing Figures

PATENTED NOV 12 1974  3,847,244

LOCK APPARATUS FOR HOISTABLE VEHICLE STRUCTURES

The present invention relates to vehicles having liftable portion such as dump-type truck beds, tiltable cabs, and so forth, and more particularly to structure wherein the hoist cylinder thereof effects not only its normal raising fuction, but also is operative to lock or unlock the liftable structure of the vehicle relative to its frame.

In essence, the invention comprises a hoist cylinder coupled between the lifltable structure and the frame of the vehicle, and linkage interposed between such hoist cylinder and at portion of the liftable structure, which is releasably tied to the frame, such that locking and unlocking of the liftable structure is effected prior to and also after the lifting and lowering of the liftable structure, respectively.

Specifically, the invention includes appropriate linkage incorporating a lost-motion connection, intercoupled between the cylinder and a fixed reaction point to the frame such that the cylinder is operable to lift the liftable structure such as a tilt cab or dump body only after a unlocking of the liftable structure relative to the frame has been achieved. Upon lowering the liftable structure, a repositioning of the liftable structure and its tying connection structure is effected completely before the operating cylinder, in its continued retraction, is effective to re-apply the lock relative to the liftable structure.

Accordingly, a principal object of the present invention is to provide hoist cylinder, linkage, and lost-motion structure such as to facilitate the locking and unlocking of liftable structure relative to an asociated vehicle frame.

A further object is to provide structure for releasably and resiliently locking liftable structure relative to its associated frame, this through a hydraulically or pneumatically operated cylinder which effects both a lifting function and also the locking and unlocking function desired.

An additional object is to provide a means for locking and unlocking a tilt cab structure to the vehicle frame associated therewith in a manner such that the cylinder hoist utilized effects not only the raising and lowering of the cab but also, through its linkage, effects an appropriate unlocking and locking of the cab relative to the frame prior to, and also subsequent to, the raising and lowering functions, respectively.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

Figure 1:
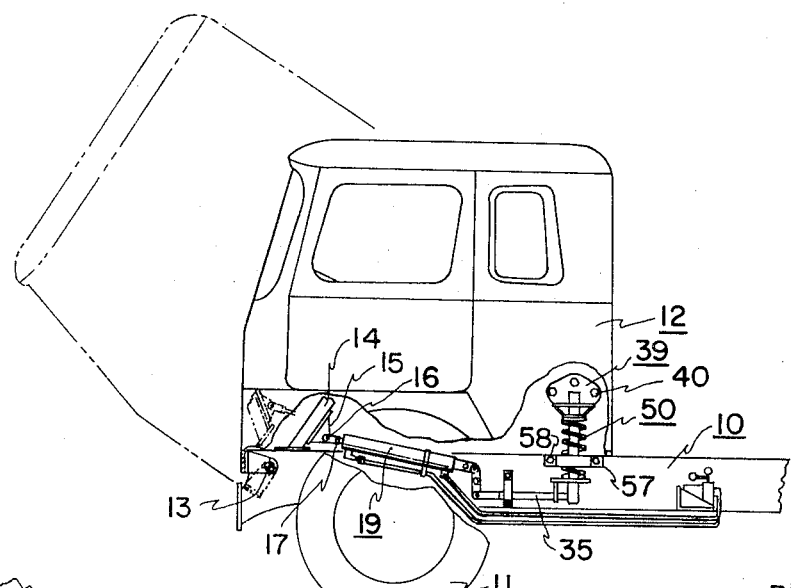
FIG. 1 is a fragmentary side elevation of a vehicle frame and lift cab incorporating the hydraulic or pneumatic cylinder and lost-motion linkage structure constructed in accordance with the principles of the present invention.

In FIG. 1, vehicle frame 10 is carried by wheels 11 in the usual manner. A tilt-type cab 12 is journaled at 13 to the frame 10 by pin means 13, clevis and pin means, or other attachments in a usual manner. The cab 12 itself includes a cab frame 14 provided with bracket 15. The latter includes a pivot bolt 16 that pivotally connects piston rod 17 to the cab frame. Piston rod 17 is integral with piston 18, or attached thereto in the usual manner, and forms an integral part of hoist cylinder 19 including the outer cylinder member 20. The construction of cylinder 19, its control 21, and the conduit 22, 23 and pressure and pumping means, form no part of the present invention. While the cylinder 19 may be of the double-acting type, other types of cylinders may, of course, be used. Vehicle frame 10 includes as a reaction member the bolt 24. Cylinder 20 includes a stub extension 25 provided with a lost-motion slot 26. End 27 of stub 25 is pivoted by pivot means 28 to lever 29. The lever is fulcrumed at slotted aperture 30 to a bushing provided pin 31, the latter being fixed to frame 10. Slotted aperture 32 is provided in lever 29 and accommodates the positionment of pivot pin 33 and its connection to the end 34 of lock arm 35. Guide bracket 36 is bolted at 37 and 38 to frame 10.

Mounted to cab 12 is a bracket 39, the mounting being effected by bolts 40. Bracket 39 includes a depending lock leg 41, which is welded at W to bracket 39. Peripherally extending about the lower flange 42 of bracket 39 is a peripheral bumper element 43, the latter having a medial protrusion 44, seated into slot 45 of the flange. Bumper pad 43 is for the purpose of resiliently engaging cone member 46, the lower portion 47 of which (see FIG. 3) is welded at 48 to the upper portion 49 of spring 50. Spring 50 is shown in fragmentary view in FIG. 7 and is seen provided with a welded rectangular plate 51 with access aperture 52. Lock leg 41 is provided with an interior depending slot 53 which receives lock arm 35 before described.

Figure 3:
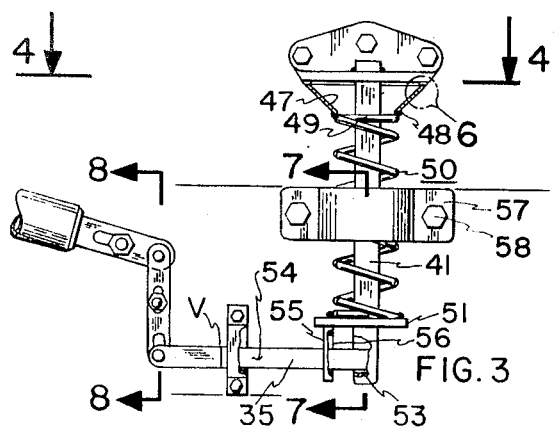
FIG. 3 is an enlarged elevation of a central portion of FIG. 2, illustating in detail the cooperation of thelock arm with its brackets and the leg depending from the cab to be locked thereby.

If desired, lock arm 35 includes a coating 54 of plastic to the right of line V in FIG. 3, which plastic may serve as an abrasion or friction-wear deterent.

Depending from plate 51 is guide 55 having slot 56.

Figure 7:
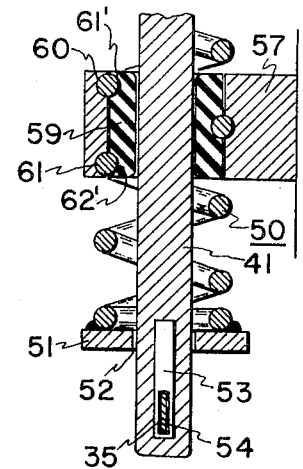
FIG. 7 is an enlarged view, shown in section, and taken along line 7—7 in FIG. 3, of the depending leg affixed to the tiltable cab when the same is in locked position as by the engagement of a lock arm with a slotted aperture of such depending leg.

Mounted to the vehicle frame 10 is a split bushing 57, mounted in place by bolts 58 and containing elastomeric bushing 59, this to preclude noise vibrations. Spring 50 may be disposed at grooves 60 and 61 in the split bushing so that spring will not move therein. The elastomeric bushing 59 may itself contain grooves 61' and 62' for receiving the spring turns as indicated in FIG. 7. Pin 31 in FIG. 2 may take the form of a post 32' secured to frame 10 by filet welds or attachment means including a turned down pin portion 63, which is threaded at 64 provide with nut 65. Bushings B, B1 and B2 may be provided the lever 29 to reduce friction wear.

The structure as above described operates as follows:

At the outset, it is to be understood that the invention pertains to any type of vehicle having any portion which is piston-raisable relative to the frame of the vehicle. The raisable portion may comprise a tilt cab, a dump bed, or any other vehicle portion which is constructed to be hydraulically or pneumatically raised relative to the fixed frame of the vehicle. Thus, the tilt-type cab in FIG. 1 is used for purposes of illustration only. In FIG. 1 it is seen that the tilt cab is pivoted at 13 to frame 10. Other types of intercooperation between the movable portion and the frame are likewise contemplated in the invention. Thus, there may be even a solely vertical movement of the raisable portion relative to the frame. In any event, it is important to note, and the crux of the invention resides in the fact that the very cylinder used to raise the raisable portion, here tilt cab 12, is likewise used, through a direct coupling structure, to unlock the movable portion relative to the frame prior to that point in time at which the tilt cab, for example, is raised.

Figure 5:
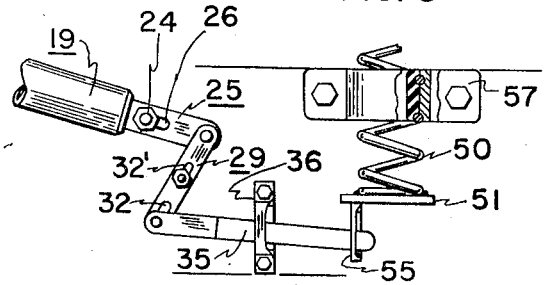
FIG. 5 is a fragmentary similar to FIG. 3, but illustrates the locking release of the lock arm at the time the pressure is initially applied the cylinder to extend outwardly the piston rod therefrom, such extension being in effect to raise the cab until the lost-motion connection associated with the cylinder reaches a reaction point of engagement therewith.

Again, the particular type of control, pumping means, and so forth related to the hoist cylinder 19 are unimportant and form no part of the invention. Hoist cylinders are in common use for a variety of vehicles, for lifting a dump bed, a tilt cab, and so forth. An essential feature in the invention is that there is a direct positive linkage between the aft or right end of the cylinder at 25 and the lock by virtue of lock arm 35, which cylinder operates to retrieve lock arm 35 and hence release the cab for lifting purposes. It is to be noted that all of this is performed prior to the time that the cab is actually raised. This is effected through the lost-motion connection including slotted aperture 26 and reaction means 24. Accordingly, as pressure is applied to piston 18 in a direction to the left in FIG. 2, the linkage, including lever 29, assumes and progessively assumes positionment in accordance with FIG. 5, thus operating to withdraw the lock arm 35 from slotted aperture 53 in FIG. 7 so as to release leg 41 and permit the same to be withdrawn under the continued pressure of the cylinder, once the reaction means, or pin 24, engages the left extremety of slot 26. It is noted that reaction means 24 is fixed to the frame of the vehicle so that once the condition achieved in FIG. 5 is reached, then the left end of the piston cylinder combination 19 is free to operate to lift the cab or other movable portion relative to the fixed frame of the vehicle. Thus, lifting is delayed by virtue of the lost-motion connection consisting of slot 26 and reaction means 24 until the unlocking has been achieved. Upon the raising, of course, the bracket 39 and its bumped pad 43 will be raised relative to the cone 46, this during the process of withdrawal of leg 41.

Figure 2:
FIG. 2 is an enlarged side elevation, shown partially in fragmentary view, illustrating structure associated with the cylinder wherein the locking mechanism is locked; the fragmentary extension of the cab and the left end of the cylinder are shown by the dotted line.
Figure 2:
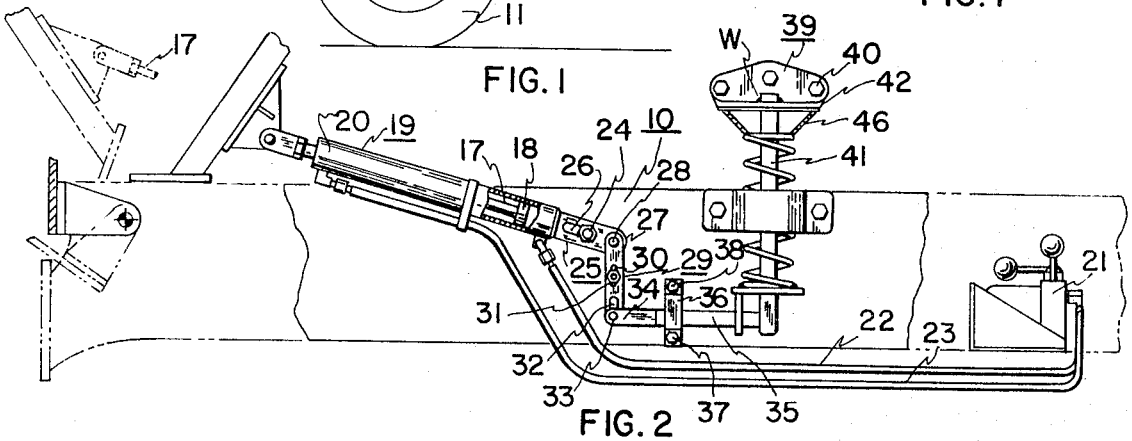
Figure 4:
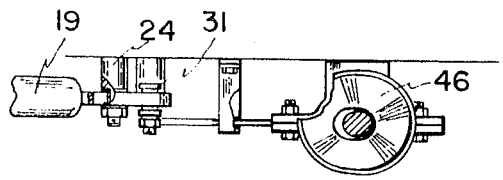
FIG. 4 is a top plan of the structure taken along the line 4—4 in FIG. 3.
Figure 6:
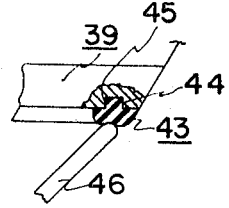
FIG. 6 is an enlarged detail taken along the arcuate line 6 in FIG. 3.
Figure 8:
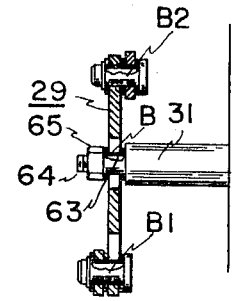
FIG. 8 is a section taken along the line 8—8 in FIG. 3.

When it is desired to lower the movable structure such as the cab 12 downwardly, then the cylinder is appropriately actuated so as to release the pressure from the right-hand side of the piston 18 in FIG. 2. After the cab 12 has dropped such that leg 41 re-enters to the position shown in FIG. 2, then the continued action of the piston will be such as to draw the end 25 of the cylinder to the left so as to separate the reaction pin means 24 from the left end of slot 26 and actually cause the stub end 25 of the cylinder to move to the left. Thus, by link or lever 29, there will be a re-urging to the left of lever 29 so as to re-engage the leg 41 at slot 53.

Cone shape member 46 simply serves as a guide for the returning leg. The spring offers resiliency to the otherwise fixed, releasable mounting of the cab to frame 10. The load of the cab is in part carried by the upper portion of spring 50. The lower portion of the spring tends to reduce by vibration of the lock arm 35 relative to leg 41.

If desired, lost-motion slots may also be incorporated in lever 29 as at 32 in FIG. 5 as well as at slot 30, 32' in the same figure. What is needed, simply, is that there be a lost-motion connection so as to effect a delayed reaction point, at some place in the linkage between cylinder 19 and lock arm 35.

It will be appreciated that any point along the cylinder hoist and linkage structure, that is between the cab and vehicle frame, may be used to incorporate the lost-motion connection, and this whether pressure cylinder is to be pivotally connected to the cab or directly to the frame and the lost-motion connection be disposed on the opposite side of the cylinder. The locking means may, of course, be inverted so as to be mounted relative to the tilt cab rather than to the frame as shown in FIG. 2.

While particular embodiments of the present invention have been shown and described, it will be obvious to those skiled in the art that changes and modifications may be made without departing from this invention in its broader aspects.

I claim:

1. In combination, first primary structure having a first locking structure; second primary structure having a second locking structure releasably lockable with said first locking structure, one of said first primary structure and said second primary structure having a reaction member; and lost-motion linkage and hoist means operably connected between said first primary structure and said second primary structure, at said second locking structure, for selectively unlocking said first and second locking structures and lifting said first primary structure relative to said second primary structure, and subsequently for effecting the lowering of said first primary structure and re-locking said first and second locking structures, said lost-motion linkage and hoist means including connection structure provided with a lost-motion slot slideably receiving and reaction member, including pressure cylinder means, and being mechanically coupled to said second locking structure whereby to move the latter to lock and unlock positions relative to said first locking structure.

2. Structure according to claim 1 wherein said first locking structure comprises a depending lock leg having an inner slot, said second locking structure comprising a rigid elongate member releasably disposed through said inner slot.

3. In combination, first primary structure having a first locking structure; second primary structure having a second locking structure releasably lockable with said first locking structure, one of said first primary structure and said second primary structure having a reaction member; and lost-motion linkage and hoist means operably connected between said first primary structure and said second primary structure, at said second locking structure, for selectively unlocking said first and second locking structures and lifting said first primary structure relative to said second primary structure, and subsequently for effecting the lowering of said first primary structure and re-locking said first and second locking structures, said lost-motion linkage and hoist means including connection structure provided with a lost-motion slot slideably receiving said reaction member, including pressure cylinder means, and being operably connected to said second locking structure, and wherein said first primary structure comprises a cab pivoted to said second primary structure, said second primary structure comprising a wheel-supported vehicle frame, said lost-motion linkage and hoist means comprising said pressure cylinder, having a piston rod pivotally connected to said cab and a cylinder having a connecting portion comprising said connection structure, said reaction member being fixed to said vehicle frame, a lever medially pivoted to said frame and articulatively coupled to said connecting portion at one extremity and to said second locking structure of said vehicle frame.

4. Structure according to claim 3 wherein said vehicle frame includes guide means for slideably receiving said second locking structure.

5. Structure according to claim 3 wherein said lever includes slotted pivot apertures.

6. In combination, first primary structure having a first locking structure; second primary structure having a second locking structure releasably lockable with said first locking structure, one of said first primary structure and said second primary structure having a reaction member; and lost-motion linkage and hoist means operably connected between said first primary structure and said second primary structure, at said second locking structure, for selectively unlocking said first and second locking structures and lifting said first primary structure relative to said second primary structure, and subsequently for effecting the lowering of said first primary structure and re-locking said first and second locking structures, said lost-motion linkage and hoist means including connection structure provided with a lost-motion slot slideably receiving said reaction member, including pressure cylinder means, and being operably connected to said second locking structure, and wherein said first locking structure comprises a retainable, depending lock leg, said second primary structure including funnel-configured guide means receiving said lock leg.

7. In combination, first primary structure having a first locking structure; second primary structure having a second locking structure releasably lockable with said first locking structure, one of said first primary structure and said second primary structure having a reaction member; and lost-motion linkage and hoist means operably connected between said first primary structure and said second primary structure, at said second locking structure, for selectively unlocking said first and second locking structures and lifting said first primary structure relative to said second primary structure, and subsequently for effecting the lowering of said first primary structure and re-locking said first and second locking structures, said lost-motion linkage and hoist means including connection structure provided with a lost-motion slot slideably receiving said reaction member, including pressure cylinder means, and being operably connected to said second locking structure, and wherein said first primary structure comprises a tilt cab tiltably connected to said second primary structure, said second primary structure comprising a wheel-supported vehicle frame, said tilt cab including a reaction surface element and a depending lock leg, as the said second locking structure, depending therefrom, said vehicle frame including a spring biased guide support guidingly receiving said lock leg and having guide cone means supportingly engaging said reaction surface support.

8. For inter-position between the tilt cab and the frame of a truck type vehicle, in combination, a reaction member constructed for securement to said vehicle frame, a hoist cylinder constructed for a pivotal securement to said cab and including a cylinder extension provided with a slotted aperture receiving said reaction member, inter-cooperating locking means for releasably securing said cab to said vehicle frame, and articulative linkage means for releasably locking said inter-cooperating means, to thereby secure said cab to said vehicle frame, said linkage means being articulatively secured to said cylinder extension.

* * * * *